US012613514B2

(12) United States Patent (10) Patent No.: US 12,613,514 B2
Feyo Gebhard (45) Date of Patent: Apr. 28, 2026

(54) QUALITY MONITORING OF INDUSTRIAL PROCESSES

(71) Applicants:GESTAMP AUTOMOCIÓN, S.A., Abadiano (ES); SMART INDUSTRY CONSULTING AND TECHNOLOGIES, S.L.U., Bilbao (ES)

(72) Inventor: Bernhard Feyo Gebhard, Nogueira do Cravo (PT)

(73) Assignees: GESTAMP AUTOMOCIÓN, S.A., Abadiano (ES); SMART INDUSTRY CONSULTING AND TECHNOLOGIES, S.L.U., Bilbao (ES)

( * ) Notice: Subject to any disclaimer, the term of this patent is extended or adjusted under 35 U.S.C. 154(b) by 408 days.

(21) Appl. No.: 15/734,551

(22) PCT Filed: Jun. 13, 2019

(86) PCT No.: PCT/EP2019/065612
§ 371 (c)(1),
(2) Date: Dec. 2, 2020

(87) PCT Pub. No.: WO2019/238890
PCT Pub. Date: Dec. 19, 2019

(65) Prior Publication Data
US 2021/0232126 A1     Jul. 29, 2021

(30) Foreign Application Priority Data
Jun. 14, 2018     (EP) .................................... 18382425

(51) Int. Cl.
*G05B 19/418*          (2006.01)
*G06K 19/06*          (2006.01)
(Continued)

(52) U.S. Cl.
CPC ... *G05B 19/41875* (2013.01); *G05B 19/4183* (2013.01); *G06K 19/06121* (2013.01);
(Continued)

(58) Field of Classification Search
USPC ........................................ 705/7.41
See application file for complete search history.

(56) References Cited

U.S. PATENT DOCUMENTS

| 5,284,164 A | * | 2/1994 | Andrews .................. A24C 5/31 |
| | | | 702/179 |
| 2002/0055925 A1 | | 5/2002 | Kondo et al. |

(Continued)

FOREIGN PATENT DOCUMENTS

EP          3208757 A1     8/2017

OTHER PUBLICATIONS

Huang et al., RFID-enabled real-time wireless manufacturing for adaptive assembly planning and control, Springer (Year: 2008).*

(Continued)

*Primary Examiner* — Allison M Neal
(74) *Attorney, Agent, or Firm* — SQUIRE PATTON BOGGS (US) LLP

(57) ABSTRACT

A method for generating a digital production quality certificate for a component carrying a machine readable unique identifier undergoing a plurality of manufacturing steps is provided. The method comprises obtaining parameters indicative of the manufacturing steps from one or more sensors for a plurality of monitored manufacturing steps. The obtained parameters are linked with the machine readable unique identifier and one or more quality analyses are performed for a selected monitored manufacturing step based on the obtained parameters for said manufacturing step. A digital quality certificate is generated for the component comprising data related to the results of the quality
(Continued)

analyses and the parameters obtained for the component are stored. The disclosure also provides examples of methods and systems of monitoring a manufacturing process.

20 Claims, 5 Drawing Sheets

(51) Int. Cl.
    *G06Q 10/0639*       (2023.01)
    *G06Q 50/04*        (2012.01)

(52) U.S. Cl.
    CPC ....... *G06Q 10/06395* (2013.01); *G06Q 50/04* (2013.01); *G05B 2219/32179* (2013.01); *G05B 2219/32196* (2013.01)

(56) References Cited

U.S. PATENT DOCUMENTS

| | | | | |
|---|---|---|---|---|
| 2005/0071032 | A1* | 3/2005 | Urabe ............. | G05B 19/41875 |
| | | | | 700/109 |
| 2005/0285440 | A1 | 12/2005 | Bal | |
| 2006/0185143 | A1* | 8/2006 | Frauen .................. | B23P 21/004 |
| | | | | 29/33 K |
| 2007/0198113 | A1* | 8/2007 | Erickson ............ | G06K 19/0723 |
| | | | | 700/95 |
| 2011/0178627 | A1* | 7/2011 | Wechter ........... | G05B 19/41875 |
| | | | | 700/109 |
| 2011/0282476 | A1* | 11/2011 | Hegemier .......... | G06Q 30/0621 |
| | | | | 705/26.5 |
| 2015/0066187 | A1 | 3/2015 | Berg et al. | |
| 2015/0254582 | A1 | 9/2015 | Remtulla et al. | |
| 2015/0324329 | A1 | 11/2015 | Blevins et al. | |
| 2017/0146975 | A1* | 5/2017 | Clark ................ | G05B 19/41875 |
| 2017/0160733 | A1* | 6/2017 | Oostendorp ..... | G05B 19/41875 |
| 2019/0129397 | A1* | 5/2019 | Horiwaki ......... | G05B 19/41885 |
| 2019/0213724 | A1* | 7/2019 | Avrahami .............. | G06F 30/00 |
| 2019/0339675 | A1* | 11/2019 | Maeda .............. | G05B 19/4183 |
| 2020/0326680 | A1* | 10/2020 | Wang ................ | G05B 19/4185 |

OTHER PUBLICATIONS

International Search Report issued for PCT Application No. PCT/EP2019/065612, 4 pages.
Written Opinion of the International Searching Authority issued for PCT Application No. PCT/EP2019/065612, 8 pages.

\* cited by examiner

QUALITY MONITORING OF INDUSTRIAL PROCESSES

CROSS-REFERENCE TO RELATED APPLICATIONS

This application is a National Stage filing under 35 U.S.C. § 371 of International Patent Application No. PCT/EP2019/065612, filed Jun. 13, 2019 and entitled "QUALITY MONITORING OF INDUSTRIAL PROCESSES," which claims the benefit of and priority to European Patent Application EP 18 382 425.9 filed on Jun. 14, 2018, both applications are incorporated by reference herein in their entirety for all purposes.

The present disclosure relates to quality control in industrial process, particularly in the automotive industry, and more particularly relates to methods and system for the generation of a quality certificate for such an industrial process. The present disclosure further relates to improved fault diagnosis based inter alia on parameters of apparatus used to carry out the industrial process. The present disclosure further relates to methods and systems for manufacturing products or components of the products and for monitoring manufacturing processes.

BACKGROUND

In a wide variety of industrial manufacturing processes, quality control is very important. Quality control in many cases relies on a visual inspection of a component or a finished product after one or more processes have been carried out. The visual inspection in many cases is manual, i.e. an operator inspects the product. It is also known to use automatic inspection or non-destructive testing using e.g. cameras, or robots, or lasers, and a suitable image processing software. If the visual (or other) inspection reveals no significant defects, a product or component may be considered to have past the quality test.

A physical quality mark may be left on the product to indicate that inspection has been performed and the product was found to satisfy the relevant requirements. The physical quality mark may be in the form of e.g. a sticker or a laser marking. The quality mark may typically further indicate a production time, date or period and the production site. Quality inspection may typically be carried out for a finished product, or half finished product, a sub-assembly or a larger component of the product. Quality analysis and tracking is usually not performed for raw materials, small parts, and subcomponents.

Such visual inspection, regardless of whether it is carried out manually or automatically, has a limited reliability however since existing defects may be invisible. A defect product or component may thus be dispatched to a client or to a further manufacturing site where further processing takes place. Moreover, an extensive quality inspection process to increase the reliability carried out on a "finished" product or part adds time and resources to the industrial process. The systems used for inspection are generally complex and therefore costly.

When a product is in use, an unexpected and/or unknown defect may be found. A manufacturer may in occasions order a recall of a series of the product based e.g. on the manufacturing site and/or manufacturing period. For a series of products, it is thus assumed that since the products underwent the same process under the same conditions, the same or similar defects may be found. Such a recall of products may be costly, complicated and possibly unnecessary:

whereas it was assumed that manufacturing conditions were the same, they actually were not. Also, potentially defect products are not recalled because they are assumed not to have the same defects, whereas in reality they do.

Vehicles such as cars incorporate a large number of different components with a large complexity, e.g. chassis, body in white (BIW), pneumatic, hydraulic and electric control systems. Different components may be built up from a large number of parts and undergo different processes involving forming (e.g. rolling, hot or cold stamping and others), joining (e.g. different forms of welding, riveting and others) and machining (e.g. milling, cutting, trimming and others). In these processes, productivity is of utmost importance and also cost control is very important. Moreover, the resulting end product has to fulfill extensive and demanding user and safety requirements. This combination of factors makes effective and efficient quality control in the manufacturing of car components very important.

US 2017/0032281 discloses a weld production knowledge system for processing welding data collected from one of a plurality of welding systems, the weld production knowledge system comprising a communication interface communicatively coupled with a plurality of welding systems situated at one or more physical locations. The communication interface may be configured to receive, from one of said plurality of welding systems, welding data associated with a weld. The weld production knowledge system may comprise an analytics computing platform operatively coupled with the communication interface and a weld data store. The weld data store employs a dataset comprising (1) welding process data associated with said one or more physical locations, and/or (2) weld quality data associated with said one or more physical locations. The analytics computing platform may employ a weld production knowledge machine learning algorithm to analyze the welding data vis-à-vis the weld data store to identify a defect in said weld.

US 2017/0032281 thus focuses on machine learning based on weld data to derive algorithms that can help in a diagnostic of a weld fault. However, the prior art as failed to develop an effective and efficient quality control system.

US 2015/0254582 discloses a method and apparatus coupling quality control data generated during the manufacture of a subassembly of components with at least a unique main product assembly identification number and the quality control data of the main product at the time of installation of a subassembly to the main product assembly.

US 2015/0066187 discloses systems and processes correlating manufacturing parameters and performance feedback parameters with individual absorbent articles manufactured by a converting apparatus. Embodiments of the systems herein may include inspection sensors configured to inspect substrates and/or component parts advancing along the converting line and communicate inspection parameters to a controller and historian. The systems may also include process sensors configured to monitor equipment on the converting line and communicate process parameters to the controller and historian. The systems may also be adapted to receive performance feedback parameters based on the packaged absorbent articles. The systems may correlate inspection parameters, process parameters, and/or performance feedback parameters with individual absorbent articles produced on the converting line. The controller may also be configured to perform various functions based on the performance feedback parameters.

US 2002/0055925 discloses that production condition data and product quality data in a production line are monitored and stored in a production history database. When a quality deterioration event in the production line is detected while checking the product quality data, the improvement contents of the quality deterioration factor and production conditions are extracted. The extracted results and pre-stored quality improvement history data are collated with each other in order to confirm the validity thereof, and a simulation of the phenomenon of the production line is executed in order to verify the correctness. When the validity and correctness are verified, the production condition for the production line are revised to improve the quality deterioration factor.

The present disclosure provides examples of systems and methods that at least partially resolve some of the aforementioned disadvantages.

SUMMARY

In a first aspect, a method for generating a digital production quality certificate is provided for a component carrying a machine readable unique identifier undergoing a plurality of manufacturing steps. The method comprises obtaining parameters indicative of the manufacturing steps from one or more sensors for a plurality of monitored manufacturing steps and linking the obtained parameters with the machine readable unique identifier. The method further comprises performing one or more quality analyses for a selected monitored manufacturing step based on the obtained parameters for said manufacturing step and generating a digital quality certificate for the component comprising data related to the results of the quality analyses. The parameters obtained for the component are stored.

According to this aspect, data received from different sensors can be used in quality analyses instead of or in addition to e.g. a visual quality analysis of a product. Quality control can thus become more reliable and may be based on parameters directly related to the manufacturing step(s). In examples of this aspect, a separate quality inspection station or process may be avoided in a manufacturing process, and rather quality analyses may form a part of at least some of the manufacturing steps. The data of the sensors are linked to a machine readable unique identifier of a product and are stored for potential later use. The data stored may in examples be used to further enhance quality analyses as will be explained herein.

A digital quality certificate as discussed throughout the present disclosure may be in the form of a file in a format and language that can be processed by suitable computer systems. The file may comprise text strings comprising different parts, of which a first part may be a unique identifier, a second part may be the identification of a quality analysis, and a third part may be the outcome of the analysis. In an example, text strings may also include parameters as obtained from the sensors.

In some examples, the method may further comprise updating the digital quality certificate after completion of the manufacturing steps by performing an additional quality analysis on the stored parameters and updating the digital quality certificate for the component by including the result of the additional quality analysis. When a series of a product has been in use, a defect may come to light. This defect may be traced back to the originally obtained parameters of the manufacturing process. And based on such a defect, a new quality control (algorithm) may be derived. Because the manufacturing data has been stored and can be linked to individual products or components, a recall of a product if necessary can be determined at an individual level, rather than a recall of a series of products based e.g. on production site or production period.

In some examples, a manufacturing step is carried out by an apparatus and one or more of the sensors measure internal control parameters of the apparatus. Instead of or in addition to external parameters of a process (which may be recorded by e.g. a camera), parameters that are internal to the process, may be used to determine a quality of the process. In particular, internal control parameters of the apparatus carrying out the manufacturing step may be used. As an example, in a laser welding process, control parameters may include laser power, laser speed and laser trajectory. Quality analyses may be performed on such parameters, rather than or in addition to the (visual) inspection of the resulting weld.

In some examples, one or more of the quality analyses is an analysis developed from machine learning from previously collected data indicative of the manufacturing steps. Large amounts of data relevant to a manufacturing process may be obtained and stored. This "big data" may be used for advanced data analytics methods that extract value from this data, i.e. machine learning and artificial intelligence may be applied to the data to develop a new quality analysis. Such a new quality may be completely based on the measured parameters of the industrial process, rather than a visual or other NDT test procedure.

In industrial manufacturing processes, such machine learning has hitherto been used mainly for predictive manufacturing to e.g. reduce downtime, and improve maintenance planning. In the present disclosure, machine learning is used to develop new quality analyses to diagnose a fault in a manufacturing process. If a new quality analysis has been developed, retroactively, the digital quality certificates that have been generated for previously manufactured (and finished, and shipped) products may be updated, and previously unidentified faults may be found.

In some examples, performing the quality analyses occurs in real-time. The data/parameters obtained during a manufacturing step may be uploaded to a server system substantially simultaneously with the manufacturing process. The quality analysis may be performed as the industrial process is on-going. As soon, as the process (step) is finished, the result of the quality analysis may be known.

In some examples, the methods may further comprise generating a warning signal if one or more results of the quality analyses are negative. In some examples, a subsequent manufacturing step cannot be carried out when such a warning signal is issued. The product may instead be redirected to a rework station where a fault may be corrected. When the quality certificate indicates that the quality is ok, the normal manufacturing processes may be continued.

In some examples, the manufacturing steps include one or more of joining, forming and machining.

In a further aspect, a method of monitoring a manufacturing process of a component comprising a plurality of manufacturing steps is provided. One or more of the manufacturing steps are monitored with sensors and the method further comprises reading a machine readable unique identifier of the component, measuring parameters indicative of the manufacturing steps for the monitored manufacturing steps, and storing the parameters indicative of the monitored manufacturing steps in a server system. In the server system the parameters indicative of the monitored manufacturing steps are linked with the machine readable unique identifier. The method further comprises performing one or more individual quality analyses by analysing the parameters indicative of an individual monitored manufacturing step and generating a digital quality certificate comprising the result of the performed analyses.

A manufacturing process may comprise a large number of different manufacturing steps. Not all of the manufacturing steps are necessarily quality sensitive. There may be some steps that are not relevant for the final product quality. In this aspect, sensors may capture different parameters that are relevant or potentially relevant for a quality sensitive manufacturing step. After the manufacturing step has been performed or substantially simultaneously with the manufacturing step, one or more quality analyses may be performed for this step. Each (quality sensitive) manufacturing step may thus be checked by a server system.

In the present disclosure, a server system may be regarded as one or more interconnected servers with storage space for storing the parameters related to the manufacturing process and processing capability to perform analysis of the data. The servers may be connected with wires or wirelessly to the sensors arranged to measure parameters related to the manufacturing processes.

In some examples, the component may be dispatched from a manufacturing site only if the results of all performed quality analyses are positive.

In some examples, a first of the manufacturing steps is performed at a first manufacturing site, and a second of the manufacturing steps is performed at a second manufacturing site which is different from the first manufacturing site, and the parameters indicative of the first and second manufacturing steps are stored in the same server system, and are linked with the same machine readable unique identifier. Regardless of where manufacturing steps take place, the data may be stored and quality analysis may be performed by the same server system. The quality of the entire value chain may be monitored. In the example of an automotive component, e.g. the chain of processes from Tier N, to Tier 2, Tier 1 to Original Equipment Manufacturer (OEM) may be monitored. Parts, assemblies, sub-assemblies, components may have their own machine readable unique identifiers.

In some other examples, different server systems may be used by different entities, e.g. a Tier 2 supplier may have one server system and produce a first quality certificate. A Tier 1 supplier may have a separate server system, and store the data to their processes in their server system, but transmit the digital quality certificate to the OEM. As long as a product with its identifier can be tracked to its assemblies, sub-assemblies and individual parts with their own identifiers, the quality of the entire value chain can be monitored. Also, digital quality certificates may be generated and updated for the entire value chain.

In some examples, the method may further comprise introducing a new quality analysis by analysing the parameters indicative of an individual monitored manufacturing step and renewing the digital quality certificate by including the result of the new quality analysis.

In some examples, storing/uploading the parameters indicative of the monitored manufacturing steps in a server system may occur substantially simultaneously with the measuring of the parameters.

In some examples, a subsequent manufacturing step cannot be performed until the individual quality analysis of a previous manufacturing step has not been performed yet. Poka-yoke mechanisms may be incorporated in the robots/systems transporting the components so that a component is blocked from further reprocessing until appropriate reworking is carried out (and the quality certificate has been updated and indicates that the quality of the part/assembly/subassembly is OK).

In some examples, the manufacturing steps include a joining step of joining a first sub-component with a second subcomponent, the first subcomponent carrying a first machine readable unique identifier and the second subcomponent carrying a second machine readable unique identifier. The resulting assembly of the components may carry a third machine readable unique identifier, which in some examples may be a combination of the first and second machine readable unique identifiers, i.e. the third machine readable unique identifier may somehow be composed of or derived from the unique identifiers of the first and second machine readable unique identifiers. In other examples, the third machine readable unique identifier is completely independent and non-derivable from the first and second identifiers.

In some examples, the digital quality certificate of the component may comprise the results of the performed analyses of both the first and the second subcomponent.

In some examples, the method may further comprise reworking a component if the results of one or more of the performed analyses are negative.

In some examples, the individual quality analyses comprise an analysis of an individual parameter. In some examples, the individual quality analyses comprise an analysis for a combination of parameters. In the case of a laser welding process for example, a single parameter (e.g. laser power) may be monitored and analysed. Alternatively, for the same laser welding process, laser power, and temperature in the weld zone are monitored and the quality analysis is based on the combination of both parameters.

In some examples, the method may furthermore comprise marking the component with a machine readable unique identifier. A machine readable unique identifier may be in the form of a RFID-tag of NFC tags. A machine readable unique identifier may also be in the form of a two-dimensional image code, e.g. a bar code, data matrix code or a QR code. In an example, laser marking may be used to mark the product with a machine readable unique identifier. Depending on the component and depending on the processes to be performed, one identifier may be more suitable than another. It is important that the identifier is unique and that the identifier can be read at the relevant workstations so that the data of the manufacturing process can be linked with the machine readable unique identifier.

In yet a further aspect, a quality control system for checking a quality of a manufacturing process of a product carrying a machine readable unique identifier and involving a plurality of quality sensitive manufacturing steps at a manufacturing station is provided. The quality control system comprises one or more sensors at the manufacturing station for measuring parameters indicative of a quality of the quality sensitive manufacturing steps, and a reader at the manufacturing stations for reading the machine readable unique identifier. The system furthermore comprises a transmitter for transmitting the measured parameters and the machine readable unique identifier to a server system, and the server system is configured to perform a method of generating a digital quality certificate in accordance with any of the examples herein disclosed.

BRIEF DESCRIPTION OF THE DRAWINGS

Non-limiting examples of the present disclosure will be described in the following, with reference to the appended drawings, in which.

DETAILED DESCRIPTION OF EXAMPLES

In these figures the same reference signs have been used to designate the same elements.

Figure 1:
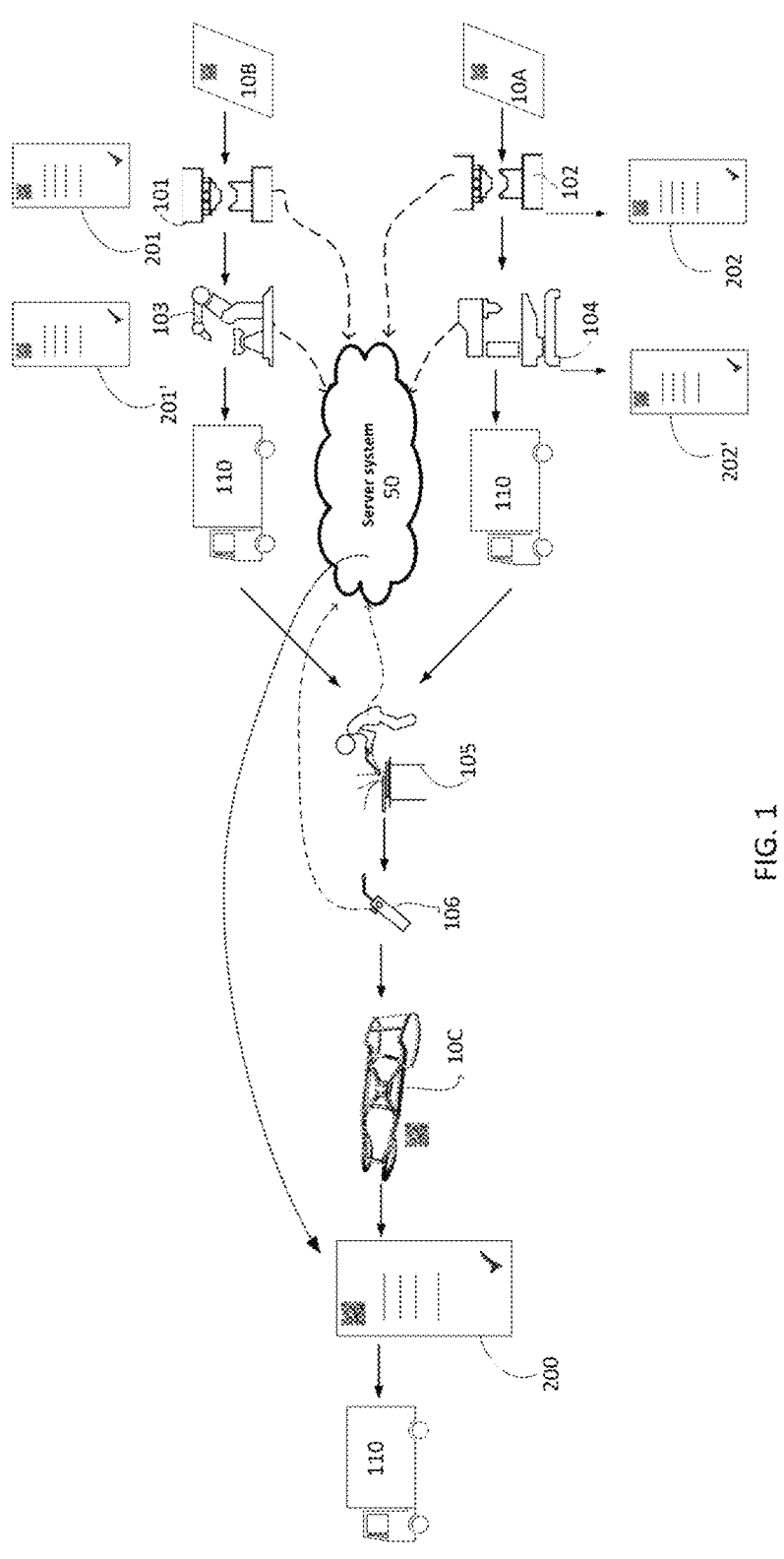
FIG. 1 schematically illustrates an example of a method of monitoring an industrial process for the manufacture of a product.

FIG. 1 schematically illustrates an example of a method of monitoring an industrial process for the manufacture of a product. In the particular depicted example, two parts 10A and 10B may undergo a forming process 101, 102 and a machining process 103, 104. In this particular example, the forming process 101 and machining process 103 is carried out a first manufacturing site, i.e. a first plant. The forming process 102 and machining process 104 is carried out a second, different, manufacturing site, a second plant. The first and second plants may belong to the same company, but this does not need to be the case.

Each of the parts carries a machine readable unique identifier, i.e. the identifier of part 10A is different from the identifier provided on part 10B. In this particular example, the machine readable unique identifier is depicted as a QR code, but the identifier may be in the form of a bar code, a laser data matrix code, a RFID tag, or other. A suitable identifier may be chosen inter alia based on the processes that have to be carried out.

The forming processes 101, 102 may include e.g. forging, stamping, rolling, extrusion or other. The machining processes 103, 104 may include e.g. such as turning, drilling, boring, milling or other. The machining process may be carried out by an operator or in an automated machine tool, i.e. a CNC machine. Depending on the processes used, suitable sensors may be provided at each of the workstation. Purely as an example, in a forming process, sensors may be arranged to measure e.g. forming speed, deformation forces but also e.g. temperature and/or noise. Purely as an example, in a drilling process sensors may be provided to obtain information on revolutions, axial speed, noise production and other.

As the parts 10A and 10B undergo the different process or prior to undergoing the processes, at the workstation the machine readable unique identifiers may be read. As machining takes places, the sensors may measure parameters that may be relevant as to the resulting quality of the process or the product. These parameters may be transmitted to a server system 50.

The server system can store the received data and link it with the machine readable unique identifiers of the parts, so that the received data can be stored appropriately and organized based on the individual part. The server system 50 may be configured to store this data well after the industrial processes have been completed. The server system 50 may further be configured to analyse the received parameters to find a deviation from a "normal" or "acceptable" process. Specifically, such analysis may be carried out in real-time, i.e. substantially simultaneously with the machining 103, 104 or forming 101, 102.

In this particular example, even if the processes 101, 103 are carried out at a different plant than the processes 102, 104, the measured parameters may be transmitted to the same interconnected server system. In other examples, processes carried out at a first site may be monitored and data may be uploaded to a first server system, and data relating to the processes carried out at a second site may be uploaded to a second separate server system. The server systems however should be able to output data e.g. a quality certificate in a format that can be processed by other server systems.

A digital quality certificate 201 may be generated based on the quality analyses of parameters measured at the first workstation during 101. The digital quality certificate may be updated and the resulting certificate 201' may comprise the results of the quality analyses based on the parameters measured during process 103.

Similarly, a digital quality certificate 202 may be generated for part 10A after and/or during the first manufacturing process 102, and the digital quality certificate may be updated 202' after and/or during the second manufacturing process 104.

For each of the manufacturing processes that parts 10A, 10B may undergo, or for a selection of the manufacturing processes (in particular quality sensitive manufacturing processes) the quality certificate may be updated.

These quality certificates may be read by one or more workstations along the manufacturing process. In an example, a suitable reader at a workstation may check the quality certificate before carrying out the corresponding process. In examples, only the server system(s) 50 has writing access to the quality certificate.

If the result of the quality analysis is positive, i.e. no faults are found or suspected, the parts 10A, and 10B may be transported to yet another manufacturing site. At this site, further manufacturing processes 105, 106 may be carried. One of these processes may include a joining step 105 e.g. by welding or riveting. Also these processes may be monitored and relevant parameters may be uploaded to server system 50. Purely as an example, in a welding process, parameters such as welding power, currents, voltages and other may be measured. Suitable parameters may also depend on the type of welding carried out, e.g. remote laser welding, spot welding, arc welding or other.

The assembly resulting from joining parts 10A and 10B may include a further machine readable unique identifier. In an example, the identifier of the assembly may carry an identifier that is composed or may be derived from the identifiers of parts 10A and 10B. The parameters of the processes 105, 106 may be linked with the machine readable unique identifier of component 10C. The server system 50 may perform quality analyses based on the obtained parameters and issue a digital quality certificate 200.

The quality certificate 200 may contain the result(s) of the performed analyses. The quality certificate 200 may also contain data on analysis that rendered a negative result but have been reworked. The quality certificate 200 may be stored in the server system 50. If the quality certificate indicates that the quality standards have been met, the product 10C may be transported further, e.g. for further processing or as an end product to a customer.

For all manufacturing processes carried out from parts to component, to sub-assembly, to assembly, to end product quality monitoring may be carried out in this manner. In an example, a selection of the processes may be made to only monitor some of the processes. The selection may be based inter alia on the effects that the process may have on the final quality of the product and on the probability of defects.

It is preferable that the parameters ("raw data") of the individual process are stored as well as the results of the quality analyses. The raw data may be stored in particular in memory in the server system 50. It is also preferable that later, even after completion or sales of the product, the quality certificate as well as the raw data can be consulted. The raw data and/or quality certificate may be accessed by selected parties for visualization on a computer screen, tablet, Smartphone or similar.

In this particular example, an end product 10C is formed, which has been depicted as a chassis for a vehicle. It should be clear however that other end products may be chosen. It should also be clear that the process depicted in FIG. 1 is highly simplified as in reality a very large number of forming, machining, joining and other manufacturing processes may be carried out, and the number of parts may be large.

Figure 2:
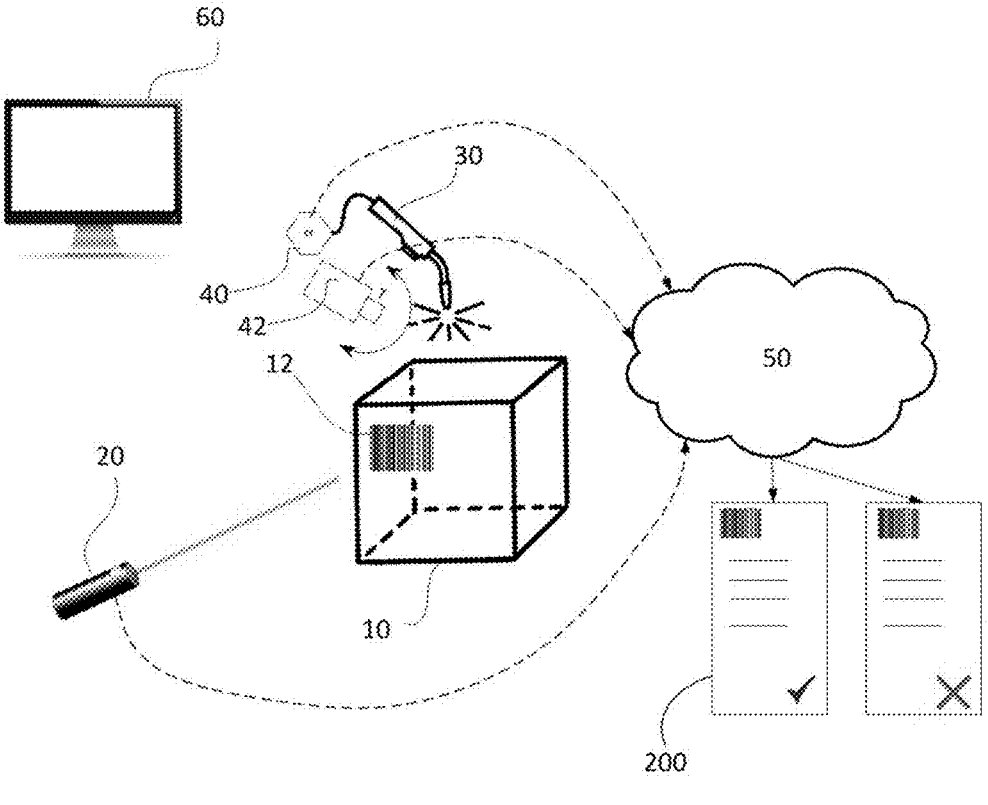
FIG. 2 schematically illustrates an example of a method and a system for generating a digital quality certificate.

FIG. 2 schematically illustrates an example of a method and a system for generating a digital quality certificate. In the example of FIG. 2, a component 10 carries a machine readable unique identifier 12 in the form of a bar code. As commented before, different sorts of identifiers may be used.

A manufacturing process is shown to be carried out with apparatus 30. As the process is carried out or prior to the process, the machine readable unique identifier 12 may be read with a suitable reader 20. In this particular example, the reader 20 is depicted as a laser 20.

Different sensors may be used to obtain suitable parameters that may be indicative of the quality of the process and/or the result of the process. In this particular example, one sensor 40 may read or obtain data from the control of the apparatus 30 carrying out or used in the process. A further sensor 42 may obtain a suitable parameter external to the apparatus. In this example, a camera 42 is shown for illustrative purposes only. It should be clear that a wide variety of sensors external to apparatus 30 could be used, e.g. sensors for detecting motion such as accelerometers, or sensors for measuring temperature or humidity or other ambient parameters.

The parameters as measured by sensors 40, 42 as well as the machine readable unique identifier 20 may be transmitted to a server system 50. The server system 50 may perform different quality analyses. In an example, one or more of the obtained parameters may be analysed on an individual level. As an example, a quality analysis may involve a comparison with a "standard" or "average" process. A significant deviation from the standard may indicate a fault.

In a further example, a quality algorithm based on several different parameters may be used. As an example, in a laser welding process, a quality algorithm might take into account welding temperature, weld speed and weld power at the same time. From the combination of these parameters an indication of the quality of the process may be derived.

The results of the quality analysis may be the generated of a digital quality certificate 200. In an example, the certificate may be a simple determination of "OK" or "NOT OK". The certificate or the results of the analysis may also be visualized on a screen 60. In this particular example, the screen 60 may be part of a monitor provided at a workstation. The results of the quality analyses may thus be shown substantially immediately to an operator carrying out the process. An operator might use the information to rework the component if necessary.

In other examples, the results may be visualized on a computer screen, a tablet, PDA or Smartphone.

One or more of the quality analyses may be derived from machine learning. As a large amount of data becomes available in a series of mass production process, machine learning may be used to derive new quality analyses. When such a new quality analysis becomes available, it may be used in new generated quality certificates 200. Also, already issued quality certificates 200 may be updated. In some cases, a quality certificate may change from OK to NOT OK.

Figure 3A:
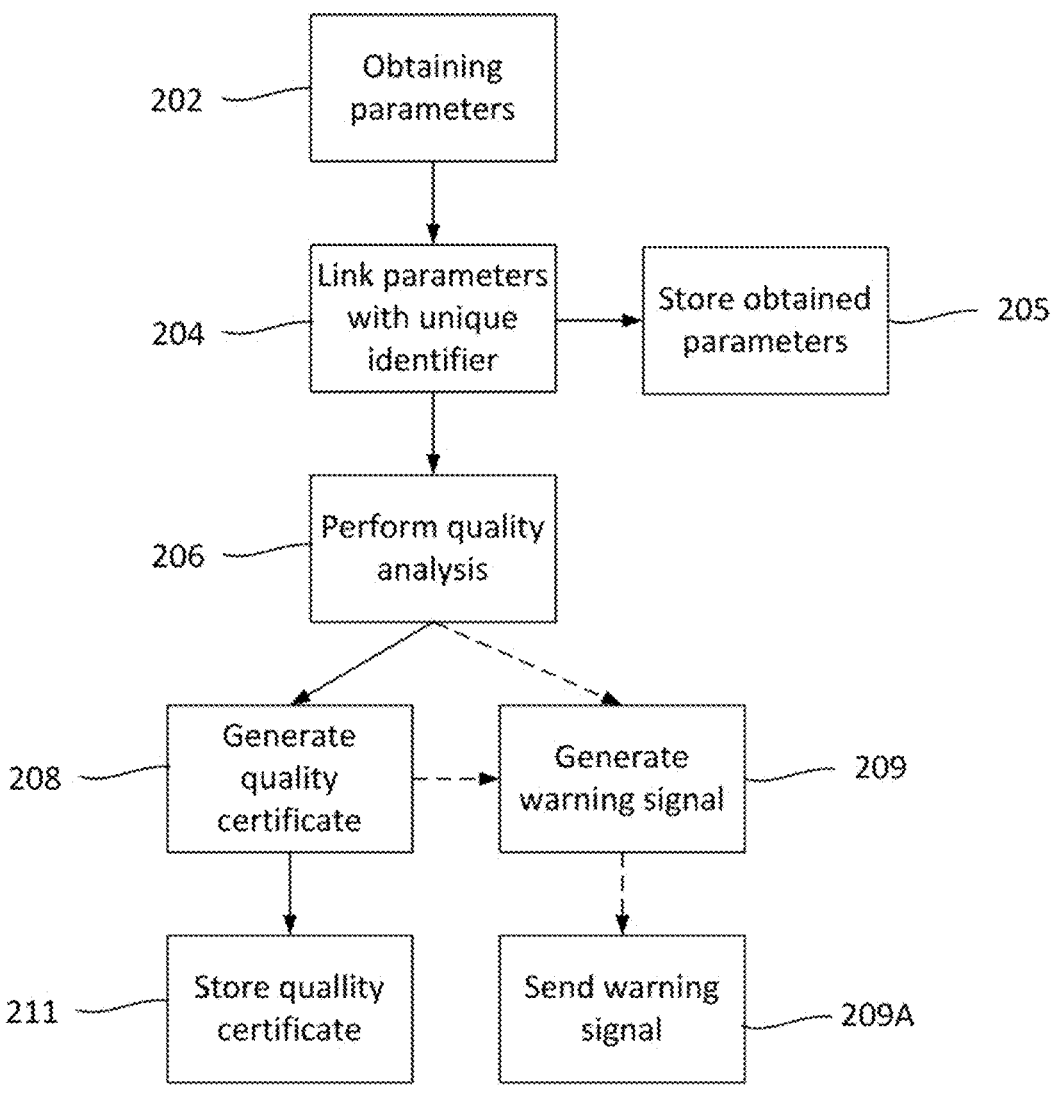
FIG. 3A illustrates a flowchart of an example of a method for generating digital quality certificate which may be carried out in a computer system, particularly a server system.

FIG. 3A illustrates a flowchart of an example of a method for generating digital quality certificate which may be carried out in a computer system, particularly a server system 50 as shown in the previous figures. At box 202, one or more parameters may be obtained by the computer system. The parameters may be obtained from a variety of sensors. In some examples, the parameters may be wirelessly transmitted. In some examples, some parameters may be directly transmitted from a control of an apparatus used for machining or other process to the computer system.

At box 204, the obtained parameters are linked with the machine readable unique identifier of the part or component upon which the process is carried out. In some examples, the machine readable unique identifier may be transmitted at the same time as the measured parameters. The obtained parameters are stored at box 205. Storing the parameters may become beneficial for future analyses.

At box 206, one or more quality analyses are performed. The results of the analyses may be used in the generation of a quality certificate at box 208. In an example, the quality certificate may include a listing of each of the quality analyses with the corresponding result. After the generation of the quality certificate, or at the same time as the generation of the quality certificate a warning signal 209 may be generated if any of the quality analyses reveals a potential defect. Purely as an example, in the case of e.g. welding, a defect may be e.g. a burn-through, or misalignment of the weld.

The warning signal may be sent at box 209A to e.g. a display as was shown in FIG. 2. In an example, the warning signal may be transmitted to a transportation system e.g. a robot programmed to pick up and deliver the part to a next workstation. If a warning signal is received and a potential defect is indicated, the part may instead be routed to a rework station.

A rework station may read the machine readable unique identifier(s) that the component or part may carry and based on these identifiers (and thanks to the link of these identifiers with the results of the quality analysis) may display the necessary rework operations to an operator at a rework station. In some examples, the part may only be processed further in other workstations or may only be dispatched from the plant if all the potential defects have been resolved. Accordingly a quality certificate may be renewed. The renewed quality certificate may comprise the new results of the quality analyses as well as information as to which rework operations were performed.

The rework stations may also be provided with suitable sensors and may transmit the data of the rework operations to the server system.

After generation of the quality certificate, the quality certificate may be stored at box 211. If they are stored, the stored quality certificates may be consulted later with a suitable computer system. As an example, a Smartphone may be used to read the machine readable unique identifier of a part and the quality certificate may then be shown to a user.

Figure 3B:
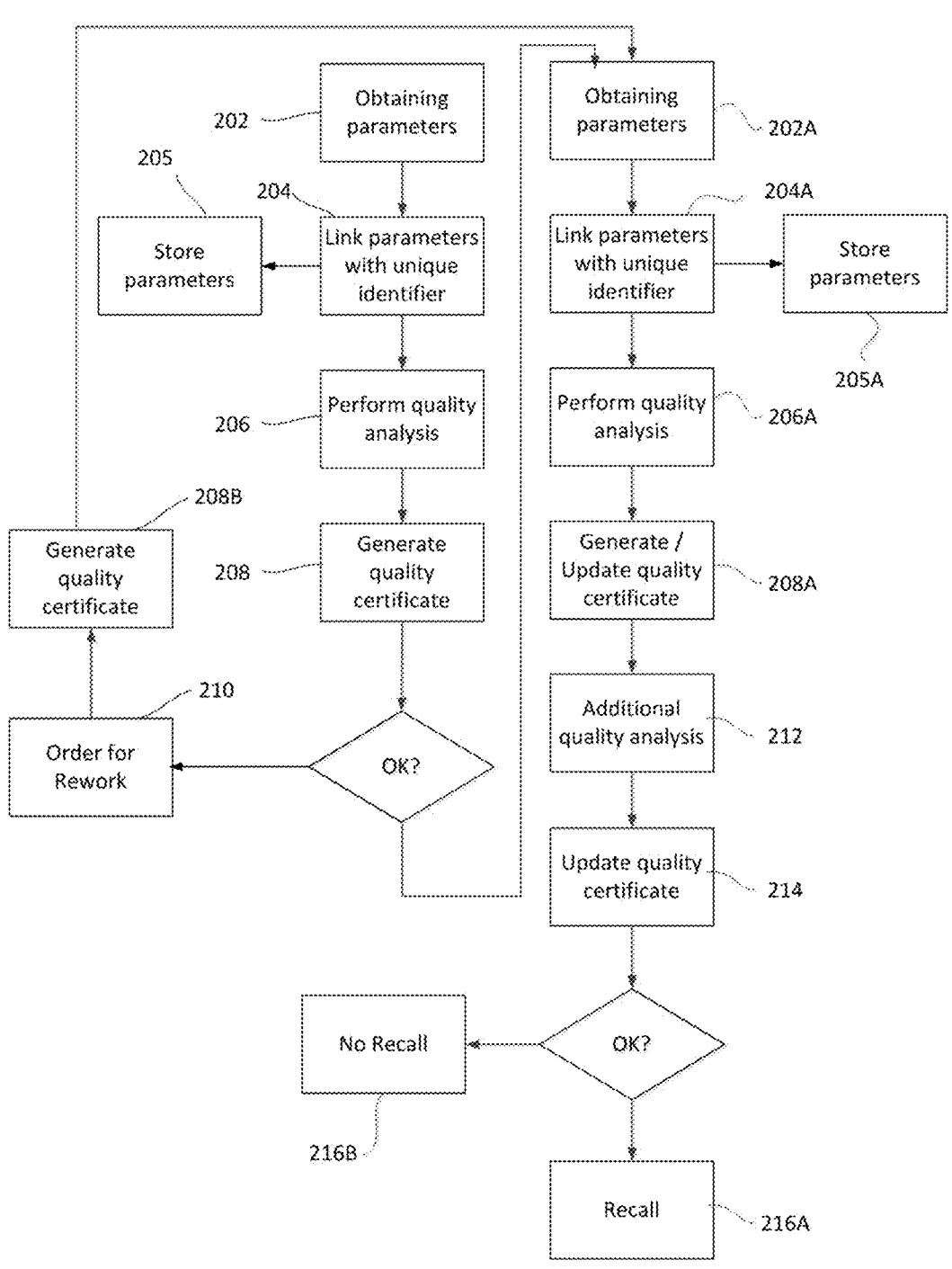
FIG. 3B illustrates a flowchart of a further example of a method for generating digital certificate which may be carried out in a computer system.

FIG. 3B illustrates a flowchart of a further example of a method for generating digital certificate which may be carried out in a computer system. The steps at boxes 202,

204, 205, 206 and 208 are the same or very similar to the steps shown and discussed in FIG. 3A.

FIG. 3B illustrates how after completing one manufacturing step, a check may be performed to determine whether quality standards have been met. If the quality standards have been met, the process may continue with a next processing step, involving the same processes 202A, 204A, 205A, 206A and 208A. At step 206A quality analyses corresponding to the subsequent processing step are performed and the results may be added to the quality certificate. The existing quality certificate in this sense may be updated or a new quality certificate could be generated.

On the other hand, if some of the quality standards are deemed not to have been met, a part may be directed to a rework station at box 210 and a new quality certificate may be generated at box 208B.

If the quality standards are deemed to have been met by the rework operations, the part may continue the manufacturing process involving the steps 202A, 204A, 205A, 206A and 208A as before.

In some examples, new quality analyses may be developed, block 212, even after a component or part has been finished, and shipped. Such a new quality analysis may be derived from e.g. machine learning based on all the collected data from previous processes. In another example, a new quality analysis may be developed or introduced e.g. from operator experience. Already issued quality certificates may be updated at box 214. This may involve quality certificates issued for components or parts of products that have already been shipped and/or sold.

If necessary, for each individual component or part, a decision for recall 216A or no recall 216B may be made based on the individual quality certificate.

Figure 4:
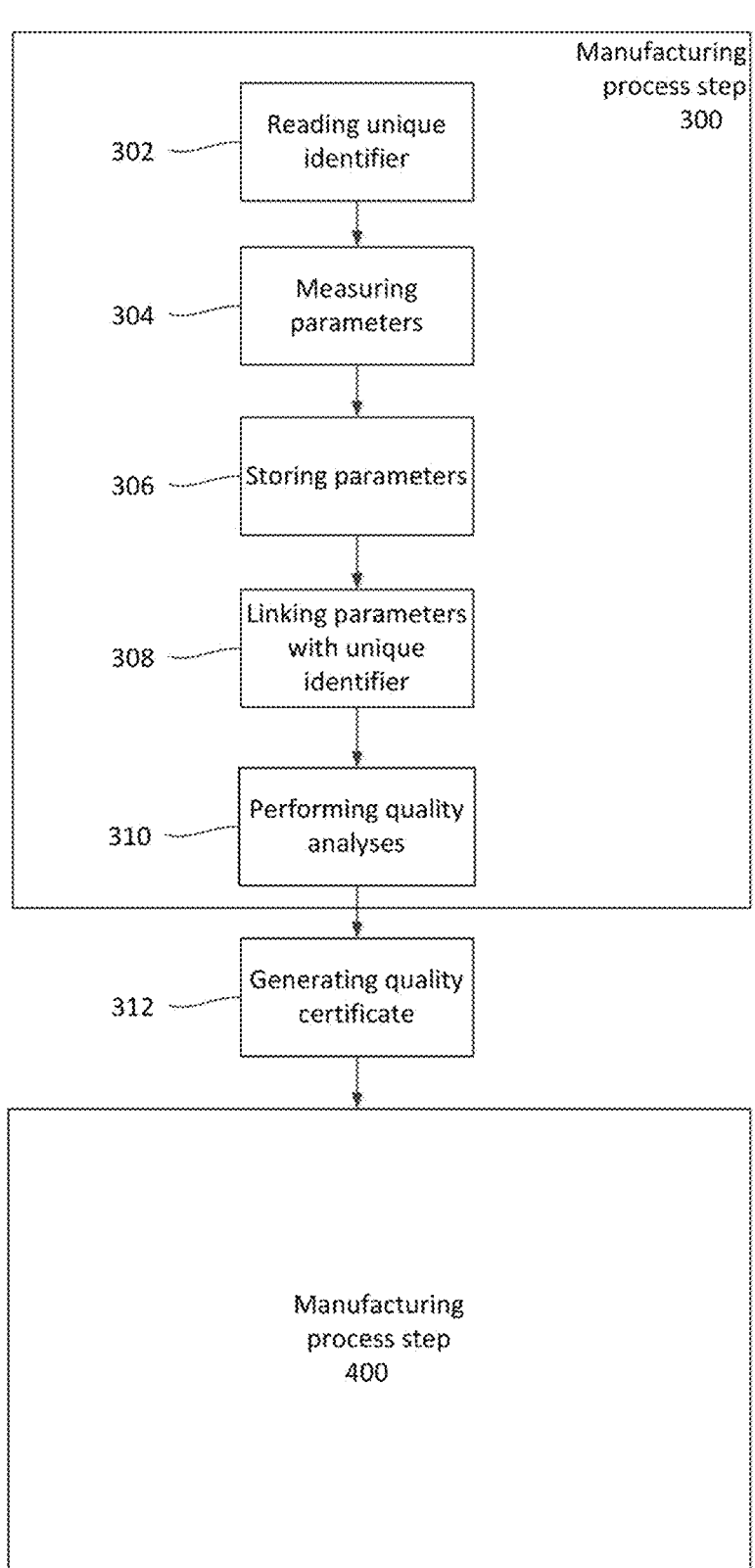
FIG. 4 schematically illustrates a flowchart of an example of a manufacturing process.

FIG. 4 schematically illustrates a flowchart of an example of a method for monitoring a manufacturing process involving steps 300 and 400. FIG. 4 therefore represents a flowchart from the point of view of the combined system rather than from the point of view of the server system (as in FIG. 3).

Whereas both manufacturing process steps 300 and 400 may include the same processes, for reasons of simplicity, they have only been indicated for step 300.

As part of the manufacturing process, or as the process is ongoing, the machine readable unique identifier may be (continuously) read at box 302. As the process is ongoing relevant parameters may be obtained 304, and stored 306 and linked 308 with the machine readable unique identifiers. Depending on the parameters measured, they may be measured, and transmitted at a rate of 1 Hz-10 KHz, and specifically at a rate of 10 Hz-1 kHz. Even though the boxes are shown consecutively and in a specific order, it should be clear that some of the steps may be carried out substantially simultaneously or in a different order.

As the process is ongoing, the quality analyses may be performed at box 310. In an example, the digital quality certificate may be generated at box 312 after completion of the process step 300, and prior to the next process step 400. Depending on the issues certificate, a next processing step 400 or may not be carried out.

The server system or other computer platform may comprise suitable hardware, software and/or firmware to carry out the hereinbefore described methods. In another aspect, a computer program product is disclosed. The computer program product may comprise program instructions for causing a computing system to perform any of the methods herein disclosed for monitoring industrial processes or for generating quality certificates.

Such a computer program product may be embodied on a storage medium (for example, a CD-ROM, a DVD, a USB drive, on a computer memory or on a read-only memory) or carried on a carrier signal (for example, on an electrical or optical carrier signal).

The computer program may be in the form of source code, object code, a code intermediate source and object code such as in partially compiled form, or in any other form suitable for use in the implementation of the processes. The carrier may be any entity or device capable of carrying the computer program.

For example, the carrier may comprise a storage medium, such as a ROM, for example a CD ROM or a semiconductor ROM, or a magnetic recording medium, for example a hard disk. Further, the carrier may be a transmissible carrier such as an electrical or optical signal, which may be conveyed via electrical or optical cable or by radio or other means.

When the computer program is embodied in a signal that may be conveyed directly by a cable or other device or means, the carrier may be constituted by such cable or other device or means.

Alternatively, the carrier may be an integrated circuit in which the computer program is embedded, the integrated circuit being adapted for performing, or for use in the performance of, the relevant methods.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A method of manufacturing a component and monitoring a manufacturing process of the component, comprising:

marking a first sub-component with a first machine readable unique identifier, and marking a second sub-component with a second machine readable unique identifier;

reading the first machine readable unique identifier of the first sub-component at a first workstation;

transmitting the first machine readable unique identifier to a server system; performing one or more manufacturing steps, including one of a forming step or a machining step, on the first sub-component at the first workstation, using a first automated machine tool;

measuring first parameters indicative of the manufacturing steps for the monitored manufacturing steps with first sensors and transmitting the measured first parameters to the server system, and wherein the first sensors measure one or more of forming speed, deformation forces, temperature, noise, revolutions, axial speed, or noise production as the first parameters, and the first parameters include internal control parameters of the first automated machine tool; and the server system generating a first digital production quality certificate for the first sub-component by: linking the obtained first parameters with the first machine readable unique identifier;

performing one or more quality analyses for a selected monitored manufacturing step of the manufacturing steps based on the obtained first parameters for the selected manufacturing step;

generating the first digital quality certificate for the first sub-component comprising data related to the results of the quality analyses;

reading the second machine readable unique identifier of the second sub-component at a second workstation;

transmitting the second machine readable unique identifier to a server system;

performing the one or more manufacturing steps on the second sub-component at the second workstation;

measuring second parameters indicative of the manufacturing steps for the monitored manufacturing steps with second sensors and transmitting the measured second parameters to the server system; and the server system generating a second digital production quality certificate for the second sub-component by: linking the obtained second parameters with the second machine readable unique identifier;

performing one or more quality analyses for a selected monitored manufacturing step of the manufacturing steps based on the obtained second parameters for the selected manufacturing step;

generating the second digital quality certificate for the second sub-component comprising data related to the results of the quality analyses, wherein the second parameters include internal control parameters of the second automated machine tool;

responsive to positive first and second digital quality certificates, joining the first sub-component to the second sub-component to form the component; generating a third digital quality certificate for the component which comprises the results of the performed analyses of both the first and the second subcomponents;

responsive to all performed quality analyses being positive, shipping the component;

storing one or more of the first or second parameters obtained for the first and second subcomponents for use after shipping of the component; and, further comprising: updating the third digital quality certificate of the component after completion of the manufacturing steps of the component and after shipping of the component by performing an additional quality analysis on one or more of the stored first or second parameters; and updating the third digital quality certificate for the component by including the result of the additional quality analysis.

2. The method according to claim 1, wherein one or more of the quality analyses is an analysis developed from machine learning from previously collected data indicative of the manufacturing steps.

3. The method according to claim 1, wherein the method of manufacturing the component includes manufacturing steps being performed at a first manufacturing site, and other manufacturing steps being performed at a second manufacturing site which is different from the first manufacturing site, and wherein one or more of the first or second parameters indicative of the manufacturing steps at the first manufacturing site and of the manufacturing steps at the second manufacturing site are stored in the same server system, and are linked with the same machine readable unique identifier.

4. The method according to claim 1, further comprising: introducing a new quality analysis by analyzing one or more of the first or second parameters indicative of an individual monitored manufacturing step; and renewing the digital quality certificate by including the result of the new quality analysis.

5. The method according to claim 1, further comprising, responsive to one or more of the performed analyses being negative, reworking the component.

6. The method according to claim 1, wherein performing the quality analyses based on the measured first parameters for the selected manufacturing step occurs simultaneously with the manufacturing steps.

7. The method according to claim 1, wherein marking the first and second subcomponents with a machine readable unique identifier comprises laser marking.

8. The method according to claim 1, wherein the forming comprises one or more of forging, stamping, rolling, and extrusion.

9. The method according to claim 1, wherein the machining comprises one or more of turning, drilling, boring, and milling.

10. The method according to claim 1, wherein the joining comprises one or more of welding and riveting, wherein the welding comprises one or more of laser welding, spot welding, and arc welding, and wherein one or more of the first or second parameters comprises welding power, welding current, welding voltage, welding temperature, welding speed, laser power, laser speed, or laser trajectory.

11. A method of manufacturing a component and monitoring a manufacturing process of the component, comprising:

marking a first sub-component with a first machine readable unique identifier, and marking a second sub-component with a second machine readable unique identifier;

reading the first machine readable unique identifier of the first sub-component at a first workstation;

transmitting the first machine readable unique identifier to a server system;

performing one or more manufacturing steps, including one of a forming step or a machining step, on the first sub-component at the first workstation;

measuring first parameters indicative of the manufacturing steps for the monitored manufacturing steps with first sensors and transmitting the measured first parameters to the server system; and the server system generating a first digital production quality certificate for the first sub-component by: linking the obtained first parameters with the first machine readable unique identifier;

performing one or more quality analyses for a selected monitored manufacturing step of the manufacturing steps based on the obtained first parameters for the selected manufacturing step;

generating the first digital quality certificate for the first sub-component comprising data related to the results of the quality analyses; and reading the second machine readable unique identifier of the second sub-component at a second workstation;

transmitting the second machine readable unique identifier to a server system;

performing the one or more manufacturing steps on the second sub-component at the second workstation, using a second automated machine tool;

measuring second parameters indicative of the manufacturing steps for the monitored manufacturing steps with second sensors and transmitting the measured second parameters to the server system, and wherein the second sensors measure one or more of forming speed, deformation forces, temperature, noise, revolutions, axial speed, or noise production as the second parameters, and the second parameters include internal control parameters of the second automated machine tool; and the server system generating a second digital production quality certificate for the second sub-component by: linking the obtained second parameters with the second machine readable unique identifier;

performing one or more quality analyses for a selected monitored manufacturing step of the manufacturing steps based on the obtained second parameters for the selected manufacturing step;

generating the second digital quality certificate for the second sub-component comprising data related to the results of the quality analyses, wherein one or more of the manufacturing steps at the second workstation are carried out by a second automated machine tool and the second parameters include internal control parameters of the second automated machine tool;

responsive to positive first and second digital quality certificates, joining the first sub-component to the second sub-component to form the component; generating a third digital quality certificate for the component which comprises the results of the performed analyses of both the first and the second subcomponents;

responsive to all performed quality analyses being positive, shipping the component;

storing one or more of the first or second parameters obtained for the first and second subcomponents for use after shipping of the component; and, further comprising: updating the third digital quality certificate of the component after completion of the manufacturing steps of the component and after shipping of the component by performing an additional quality analysis on one or more of the stored first or second parameters; and updating the third digital quality certificate for the component by including the result of the additional quality analysis.

12. The method according to claim 11, wherein one or more of the quality analyses is an analysis developed from machine learning from previously collected data indicative of the manufacturing steps.

13. The method according to claim 11, wherein the method of manufacturing the component includes manufacturing steps being performed at a first manufacturing site, and other manufacturing steps being performed at a second manufacturing site which is different from the first manufacturing site, and wherein one or more of the first or second parameters indicative of the manufacturing steps at the first manufacturing site and of the manufacturing steps at the second manufacturing site are stored in the same server system, and are linked with the same machine readable unique identifier.

14. The method according to claim 11, further comprising: introducing a new quality analysis by analyzing one or more of the first or second parameters indicative of an individual monitored manufacturing step; and renewing the digital quality certificate by including the result of the new quality analysis.

15. The method according to claim 11, further comprising, responsive to one or more of the performed analyses being negative, reworking the component.

16. The method according to claim 11, wherein performing the quality analyses based on the measured second parameters for the selected manufacturing step occurs simultaneously with the one or more manufacturing steps.

17. The method according to claim 11, wherein marking the first and second subcomponents with a machine readable unique identifier comprises laser marking.

18. The method according to claim 11, wherein forming with the second automated machine tool comprises one or more of forging, stamping, rolling, and extrusion.

19. The method according to claim 11, wherein machining with the second automated machine tool comprises one or more of turning, drilling, boring, and milling.

20. The method according to claim 11, wherein the joining comprises one or more of welding and riveting, and wherein the welding comprises one or more of laser welding, spot welding, and arc welding, and wherein one or more of the first or second parameters comprises welding power, welding current, welding voltage, welding temperature, welding speed, laser power, laser speed, or laser trajectory.

* * * * *